April 9, 1963 L. GIL DE GIBAJA HERRERO 3,084,708
WATER LEVEL CONTROL SYSTEM
Filed Jan. 5, 1960 2 Sheets-Sheet 1

INVENTOR
LEONIDAS GIL DE GIBAJA HERRERO

BY *Samuel L. Davidson*
ATTORNEY

United States Patent Office 3,084,708
Patented Apr. 9, 1963

3,084,708
WATER LEVEL CONTROL SYSTEM
Leonidas Gil de Gibaja Herrero, A No. 10 Le Puntilla, Miramar, Marianao, Havana, Cuba
Filed Jan. 5, 1960, Ser. No. 613
10 Claims. (Cl. 137—392)

This invention relates to liquid level control systems and in particular relates to a liquid level control system for use with a plurality of tanks.

In certain areas throughout the world the terrain is rather flat, and as a result water is not supplied to buildings under a sufficient pressure-head to allow for delivery of the water above the surface level. To build up a sufficient pressure-head for delivering water to different levels of buildings, it is common practice in the flat areas to place a storage tank in an upper level of a building and to pump water thereto from a supply tank placed in a lower level of the building. The tank on the lower level is fed from a public water main with water under low pressure. Water exiting from various valve outlets placed at different levels throughout the building is supplied to the valve outlets by pipework attached to the tank on the upper level, and therefore the water exits under sufficient pressure.

In places where it is necessary or desirable to have a water system of the above type, it is also desirable to provide an automatic control system which assures maintenance of an adequate supply of water in the tank on the upper level at all times. At the same time, it is desirable to provide a control system which incorporates means to prevent unnecessary operation and damage to the pump when there is not a sufficient supply of water in the supply tank.

In my United States Patent No. 2,884,001, I described an electrical control system for use with electrically responsive means governing the flow of liquid from a supply reservoir to a storage tank; and this system finds particular utility in situations such as discussed in the foregoing paragraphs. By referring to that patent, it will be noted that the systems described therein (1) provide a liquid level control system which incorporate means to maintain the liquid in the storage tank at a minimum level, but which renders the means for delivering liquid to that tank inoperative when there is an inadequate supply of liquid in a suppy tank; (2) provide a water level control system which is not subject to momentary surging or vibratory operation; (3) provide an electrically-operated liquid level control system which is responsive to both the level of liquid contained in a storage tank and the level of liquid contained in a supply tank from which the storage tank is fed; and (4) provide a control circuit which automatically turns on the supply of liquid to a storage tank when the liquid in the tank reaches a predetermined minimum level and which automatically shuts off the supply to that tank when the liquid reaches a predetermined maximum level, but which also automatically renders the means for delivering liquid from one tank to the other inoperative should the liquid contained in the supply tank from which the storage tank is fed reach a predetermined minimum level.

Although the systems described in my patent perform satisfactorially and operate as discussed, I have discovered certain improvements which can be made on those systems. Accordingly, an object of the present invention is to provide an electrical control system for use with electrically responsive means governing the flow of liquid at any temperature from a supply reservoir to a storage tank, which system incorporates a switching means for energizing the flow governing means, and circuits for preventing operation of the switching means when the liquid in a supply tank is below a predetermined level, and circuits for causing energization of the switching means when the liquid in the storage tank is below a predetermined level and for causing deenergization of the switching means when the liquid in the storage tank is above another predetermined level, and which system (a) minimizes the number of components required for effective operation; (b) provides for greater efficiency in operation; (c) utilizes, according to the preferred embodiments of the invention, a plurality of electrodes disposed in the storage tank for control of energization and deenergization of the switching means; (d) provides for convenient grounding of the storage tank; and (e) according to the preferred embodiments, eliminates the necessity of providing continuous current responsive devices.

It should be understood that continuous current responsive devices have certain advantages as explained in my patent, and as pointed out in discussions in this specification hereinafter. However, in some instances where cost is a primary factor, I have found that efficient operation of my control circuits can be achieved without utilization of such devices. Thus, another object of this invention is to provide an electrical control system in accordance with preceding objects which is inexpensive to fabricate, install and maintain.

Still further objects of this invention are (1) to provide an electrical control system of the above described type wherein the switching means is electromagnetic and the circuitry is so assembled that currents are passed through the switching means in opposite directions to set up opposing magnetic fields for energization and deenergization control; (2) to provide an electrical control system of the above-described type wherein two circuits are coupled to the switching means, and means are provided for diverting current from one of the circuits to the other to effect control of the switching means; (3) to provide an electrical control system of the above-described type wherein electrodes are utilized for control of liquid level in the storage tank, and the electrodes are so coupled in the system as to form parallel resistance branches which control current passing through the switching means and thereby control energization and deenergization of the switching means; (4) to provide a control system as described hereinabove wherein current traveling through, or between, electrical elements in the storage tank passes directly to electrical ground without any flow through parts of the circuit traversed by other current components; and (5) to provide a system wherein the circuitry associated with one tank is isolated from the circuitry associated with another tank.

Still further and more specific objects of the invention are to provide systems (a) wherein a single switching means such as a relay or solenoid can be coupled to two circuits which serve to control the switching means; (b) wherein such single switching means is responsive to one magnitude of current for energization and a lower magnitude of current is required to maintain the switching means energized; and (c) wherein continuous current responsive devices are used to control impedance in the circuits coupled to the switching means, and such devices are responsive to one magnitude of current for activation and a lower magnitude of current is required to maintain the devices activated.

As will be appreciated from the description of the invention appearing below, all of the objects set forth above are not applicable to all of the systems described. However, each system meets many of the objects, and the invention accomplishes all of the stated objects.

Briefly, the control circuit provided by this invention comprises a switching means operably coupled to a flow governing means such as a pump, and two circuits or paths linked to the switching means through which current may flow. One of the circuits includes means for controlling current passing through the switching means so as to prevent energization of the switching means whenever there is not an adequate accumulation of liquid in the supply reservoir. The other circuit includes means for controlling current passing through the switching means so as to result in energization of the switching means and linked flow governing devices whenever the supply of liquid in the storage tank is low, and to cut off the switching means and flow governing device whenever the supply of liquid in the storage tank is sufficient. According to the preferred embodiments of the invention, electrodes are used for control in the storage tank.

The invention will be better understood, and objects other than those specifically set forth above will become apparent when consideration is given to the following detailed discussion of the exemplary embodiments of the invention. The exemplary embodiments are described in connection with the annexed drawings wherein.

Figure 1:
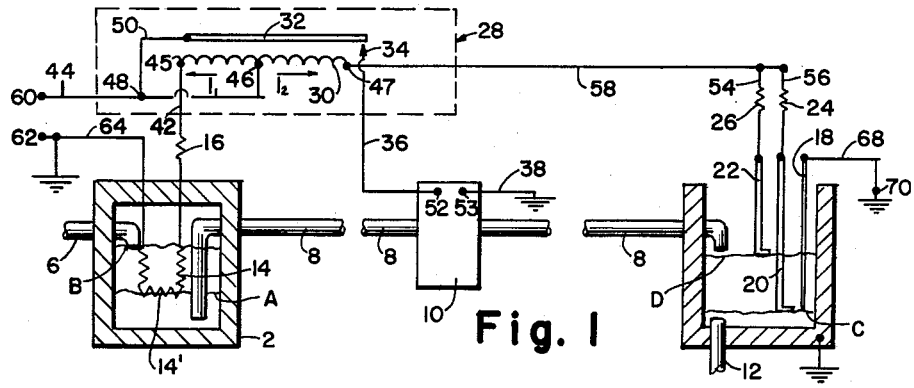
FIGURE 1 is a schematic view of the preferred control system provided by this invention.

Now, by referring to the drawings, it will be noted that in each of the figures two tanks designated by the numerals 2 and 4 are presented. The tank 2 which is hereinafter referred to as the supply tank or supply reservoir is fed with liquid via a supply pipe 6. In instances where the system of this invention is used for control of water supply within a building, the tank 2 is placed on the lower level of the building, and the pipe 6 is connected with the city water supply. The tank 2 is closed so that when full there is no spill over, or the like, of liquid being fed thereto.

A pipe 8 leads from tank 2 to a flow governing means 10. The flow governing means is a pump or the like in the building water supply system used for example herein and causes water to flow from tank 2 through pipe 8 and into tank 4. Tank 4, in the example under consideration is placed on an upper level of the building, and water travels from tank 4 through outlet pipe 12 to the various valve outlets in the building.

By having the supply tank 2 on a lower level of the building, water can be fed thereto without any pressure head under the action of gravity, and by having the storage tank 4 on the upper level of the building, water can be supplied to the various outlets in the building under the pressure head developed due to gravity because of the location of tank 4 on a roof, in an attic, or the like.

The type of tank used, pipe connections, and the particular flow governing means are presented for purposes of explanation, and thus, it should be understood that any type of plumbing can be utilized in conjunction with the control systems provided by this invention. The flow governing means, however, must be electrically responsive, i.e., capable of being activated or energized by means of an electrical switch.

The invention is particularly concerned with controlling the transfer of liquid from a supply tank to a storage tank, the maintenance of an adequate liquid supply in the storage tank, and the prevention of damage to the pump or other flow governing means in the event the supply tank is dry. The systems shown in the drawings achieve these ends as explained in the following paragraphs.

*Circuit of FIGURE 1.*—In FIGURE 1, the numeral 28 designates a switching means, the numeral 14 designates a level sensitive element which, as hereinafter explained, prevents energization of switching means 28 when the liquid in the supply tank is below a given level, and the numerals 18, 20 and 22 designate electrodes which, as also hereinafter explained, control energization and de-energization of the switching means 28 in accordance with the liquid livel in the storage tank 4.

The switching means 28 is a solenoid or relay as shown and comprises a coil 30, a switch blade 32 and a switch contact 34. Coil 30 is center-tapped as at 46, and current is fed into the system via a conductor 44 which is coupled to coil 30 at center tap 46, and to one terminal of a power supply (not shown) at point 60. Also coupled to the power supply at point 60 is blade 32 which, as shown, is connected via lead 50 to lead 44 at point 48. Cooperating with the free end of blade 32 is a blade contact 34 which is connected via lead 36 with one terminal 52 of the flow governing means 10. The other terminal 53 of the flow governing means 10 is connected to electrical ground via lead 38. With these connections, blade 32 serves to connect and disconnect flow governing means 10 with the source of power, and thus serves to activate and deactivate the flow governing means.

The position of blade 32 with respect to contact 34 is controlled by the magnetic fields set up in solenoid coil 30. The magnetic fields set up in coil 30 depend on the currents flowing therethrough, and the currents flowing therethrough depend on the liquid levels in tanks 2 and 4 because of the disposition of level sensitive element 14 and electrodes 18, 20 and 22.

Level sensitive element 14, which as shown is a resistance, but which may be any component which varies in electrical conductance characteristic in accordance with the level of liquid in contact therewith, is disposed in tank 2 and has one lead coupled to electrical ground via lead 64. The other end is coupled via lead 40, resistor 16, and lead 42 to one end of coil 30. Thus, a first circuit or complete current path is formed from point 60, through lead 44, through the portion of coil 30 between points 45 and 46, through lead 42, resistance 16, lead 40, and level sensitive element 14 to point 62. This current path, as explained below, is responsibe for preventing energization of the switching means 28 in the event there is an inadequate supply of water in tank 2.

A second and separate circuit or complete current path is established between point 60 and the electrical ground connection at 70. This second path comprises lead 44, the portion of coil 30 between points 46 and 47, lead 58, leads 54 and 56, resistance 24 and 26, electrodes 18, 20, and 22, any liquid existent between electrodes 18, 20 and 22 and lead 68. Electrodes 20 and 22 which are coupled with lead 58 via resistances 24 and 26 respectively, form parallel current branches as hereinafter explained with respect to operation of the circuit of FIGURE 1. It is important to understand at this point, however, that if water in tank 4 is below the level designated by the character C, there is no complete current path between the right end of coil 30 and electrical ground because water in tank 4 couples electrodes 20 and 22 with electrode 18 and ground. It is also important to note that the terminal ends of electrodes 18 and 20 are disposed at one level in tank 4 and the terminal of electrode 22 is disposed at a higher level in tank 24.

OPERATING CONDITIONS

All of the circuits presented in the drawings operate under various conditions depending on the liquid levels in tanks 2 and 4. For this reason, listed below are five operating conditions, which will be referred to hereinafter for purposes of explaining operation of the circuits. Capital letters A and B represent different liquid levels in tank 2 and letters C and D represent different liquid levels in tank 4 as shown in FIGURES 1–5. Conditions of operation are:

(I) Liquid level in tank 2 is below A, and liquid level in tank 4 is below C.

(II) Liquid level in tank 2 is below A, and liquid level in tank 4 is above C.

(III) Liquid level in tank 2 is at or near B, and liquid level in tank 4 is below C.

(IV) Liquid level in tank 2 is at or near B, and liquid level in tank 4 is above C and below D and tank 4 is filling.

(V) Liquid level in tank 2 is at or near B, and liquid level in tank 4 is at D.

Operation of Circuit of FIGURE 1

(a) *Condition I.*—When condition I exists with the circuit of FIGURE 1, there is no complete current path from the right end of coil 30 to ground. Thus, any current entering the circuit at point 60 travels through lead 44, the left portion of coil 30, lead 42, resistance 16, lead 40, level sensitive element 14 and lead 64 to ground. Level sensitive element 14 has sufficient resistance to limit the current flowing in the circuit so that the current is not sufficient to pull blade 32 into engagement with contact 34. Thus, when the level of liquid in tank 2 is below level A, switching means 28 is prevented from being energized and flow governing means 10 is not activated.

(b) *Condition II.*—When the circuit of FIGURE 1 is in condition II, there is a complete circuit from the right end of coil 30 to the point 70 connection with ground. However, the current which traverses the first circuit, i.e., lead 44, the left portion of coil 30, lead 42, resistance 16, lead 40, level sensitive element 14 and lead 64 is still insufficient to cause blade 32 to engage contact 34, and the current through the second circuit from the right end of coil 30 to ground is not sufficient to cause blade 32 to engage contact 34. The current entering the control circuit at point 46 splits into two components $I_1$ and $I_2$, $I_1$ traveling through the first circuit and out to ground via lead 64, and $I_2$ traveling through the second circuit and out to ground via lead 68. $I_2$ opposes $I_1$, and since $I_1$ is not sufficient to cause energization of switching means 28, $I_2$ only diminishes the effect of $I_1$. Of course, if the liquid level in tank 4 is at D, current passes from electrode 22 through the liquid to electrode 18 as well as from electrode 20 to electrode 18. Thus, current component $I_2$ may be larger than component $I_1$, however, even in such case component $I_2$ is not sufficient to cause energization of switching means 28.

From the above discussion of operation, it should be apparent that switching means 28 will not be energized whenever the liquid level in tank 2 is below A.

(c) *Condition III.*—When the liquid level in tank 2 is at or near level B, level sensitive element 14 which is a resistance as shown, is effectively short circuited, and thus current component $I_1$ is larger than the same component is under conditions I and II. Component $I_1$ causes energization of switching means 28, blade 32 engages contact 34 and flow governing means or pump 10 causes liquid to be delivered to tank 4. Until the liquid in tank 4 reaches level C, no current flows through the second circuit and $I_2=0$.

(d) *Condition IV.*—When the liquid being delivered to tank 4 under condition III reaches level C and rises thereabove, current begins to flow from point 47, through lead 56, resistance 24, electrode 20, electrode 18 and lead 68 to ground. This current, component $I_2$, is not sufficient to cause deenergization of switching means 28 although it opposes component $I_1$.

As liquid is transferred from tank 2 to tank 4, the level in tank 2 decreases, and as this level decreases more resistance appears in the first circuit due to the fact that less of level sensitive element 14 is short circuited. However, this factor does not change the operating conditions of the circuit because switching means 28 requires one magnitude of current for energization, and a lower magnitude of current to maintain the switching means energized. Thus, only when the level of liquid passes below A, where the flat portion 14′ of level sensitive element 14 is no longer short circuited, does the resistance in the first circuit increase sufficiently to prevent $I_1$ from maintaining the switching means energized.

(d) *Condition V.*—As liquid continues to fill tank 4, eventually the level in that tank reaches D, whereupon current begins to flow from electrode 22 to electrode 18. Resistor 26 is smaller than resistor 24, and the two resistors and associated electrodes form a parallel network through which component $I_2$ flows. Component $I_2$ increases so that it effectively cancels the effect of component $I_1$, and switching means 28 is deenergized.

As liquid is drained from storage tank 4 through pipe 12, and the liquid level in tank 4 decreases below D, switching means 28 remains deenergized until the level goes below C because component $I_2$ passing through resistance 24, electrode 20 and electrode 18 to ground is sufficient to oppose component $I_1$ to prevent energization of switching means 28.

Figure 2:
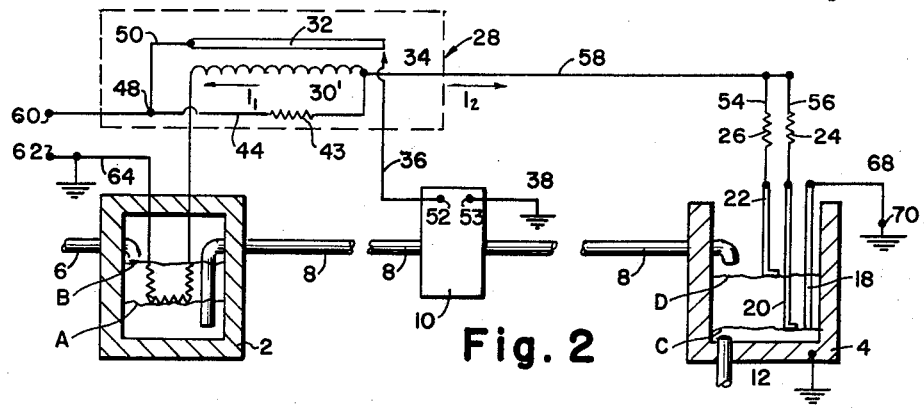
FIGURE 2 is a schematic view similar to FIGURE 1, but showing a modified form of circuitry provided in accordance with the teachings of this invention.

*Circuit of FIGURE 2.*—The circuit of FIGURE 2 is similar to the circuit shown in FIGURE 1, the only differences being that (1) a simple coil 30′ is used in place of center-tapped coil 30, (2) lead 44 connects with point 47′ of coil 30′ instead of the center tap of coil 30, and (3) power dissipation resistor 43 is connected in series in lead 44. Aside from these differences, the circuit is the same as presented in FIGURE 1.

Operation of the Circuit of FIGURE 2

(a) *Condition I.*—Operation of the circuit of FIGURE 2 under condition I is the same as operation of the circuit of FIGURE 1 in this condition. Switching means 28 is not energized, and flow governing means 10 is not activated because level sensitive element 14 limits the current flowing in the only complete circuit path, i.e., from point 60, through lead 44, resistance 43, and coil 30′, level sensitive element 14, and lead 64 to ground. No current flows through the second circuit including electrodes 18, 20, and 22 because there is no liquid conducting path between those electrodes.

(b) *Condition II.*—When the water level in tank 2 is below level A, and the level in tank 4 is above C, the switching means 28 still will not be energized. The current flowing through the first circuit is limited by level sensitive element 14. Moreover, current also flows through lead 58, resistance 24, electrode 20, liquid in tank 4, electrode 18, and lead 68 to ground, and this current path is in parallel with the path traversed by current in the first circuit. Thus, the current flowing through coil 30′ is less under this condition than under condition I.

(c) *Condition III.*—When the liquid level in tank 2 is at or near level B, level sensitive element 14 is short circuited, and the current traversing the first circuit is sufficient to energize switching means 28 and thereby activate flow governing means 10. As a result, water begins to fill tank 4. As should be apparent, there is no current flowing in the second circuit since there is no conduction by liquid between the electrodes in tank 4.

(d) *Condition IV.*—As tank 4 begins to fill, the liquid level in tank 4 rises above C and the second circuit is completed by liquid between electrodes 18 and 20. However, the resistance 24 and the resistance of the liquid limit such current flow, and the major portion of current flowing in the overall system traverses the first circuit. Thus, the current through coil 30′ remains of sufficient magnitude to maintain the switching means 28 energized, i.e., to maintain blade 32 in engagement with contact 34.

Even though the level of liquid in tank 2 decreases below B, and more resistance appears in the first circuit, the current through that circuit is of sufficient magnitude to maintain switching means 28 energized.

(e) *Condition V.*—As tank 4 fills, eventually the level of liquid therein reaches D, whereupon the liquid completes a circuit between electrode 18 and electrode 22. Thus, the second circuit includes a parallel resistance branch between point 47 and electrode 18. Current can flow from point 47 through lead 54, resistance 26, electrode 22, and the liquid in tank 4 to electrode 18, or the current can flow through lead 56, resistance 26, electrode 22, and the liquid in tank 4 to electrode 18, or the current can flow through lead 56, resistance 24, electrode 20 and the liquid to electrode 18. Resistance 26 is of such magnitude that the overall resistance of the parallel path in the second circuit is low compared with the resistance encountered by current in the second circuit where only resistance 24 and the resistance of the liquid were in circuit. Thus, current flowing into point 47 is diverted from the first circuit to the second circuit due to the parallel relationship between circuits and the switching means 28 is deenergized. Considering current components, $I_1$ represents the current flowing in the first circuit, and $I_2$ the current flowing in the second circuit. When liquid reaches level D in tank 4, $I_2$ increases and $I_1$ decreases because of the decrease in resistance of the second circuit which is in a parallel connection with the first circuit.

After the switching means 28 is deenergized, water is drained from tank 4 by various outlets throughout the building, and the water level in tank 4 goes below D and approaches C. The switching means 28, however, is not energized. The current flowing through the first circuit is not sufficient to energize switching means 28 until the level in tank 4 goes below C and no current flows in the second circuit. It will be remembered that in condition IV switching means 28 was energized, and when $I_2$ began to flow as water in tank 4 reached C, the switching means remained energized. However, it takes a greater magnitude of current to energize switching means 28 than it does to maintain it energized. Thus current component $I_1$, or the current in the first circuit was of sufficient magnitude to maintain switching means 28 energized under condition IV when electrode 20 and resistance 24 were in circuit, but the same current is not of sufficient magnitude to change the switching means from a deenergized to an energized state, and thus the switching means remains deenergized.

With the circuits of FIGURES 1 and 2, if the level of liquid in tank 4 goes below C, and the level of liquid in tank 2 is between A and B, switching means 28 will be energized because the current component through the first circuit is not opposed or diverted and is thus sufficient for energization.

Figure 3:
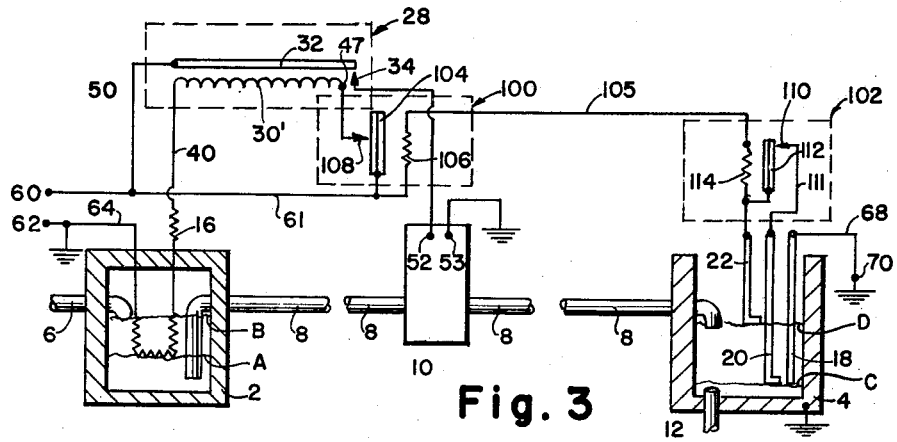
FIGURE 3 is a schematic view of still another modified form of control system provided by this invention.

*Circuit of FIGURE 3.*—The circuit of FIGURE 3 incorporates switching means 28 operably coupled with flow governing means 10 as in the circuits heretofore discussed. Blade 32 engages contact 34 under the action of magnetic fields set up in coil 30', and such engagement results in current travel to the flow governing means 10 and activation thereof. The flow of current in the circuit is, however, somewhat different from that existent in the circuits of FIGURES 1 and 2 because of the introduction of continuous current responsive devices 100 and 102.

The first circuit of the system presented in FIGURE 3 provides a current path from input point 60, through lead 61, bimetallic strip 104, contact 108, coil 30', lead 40, resistance 16, level sensitive element 14 and lead 64 to ground. The second circuit of the system presented in FIGURE 3 provides a current path from point 60, through lead 61, heating resistor 106 of continuous current responsive device 100, lead 105, heating resistor 114 of continuous current responsive device 102, and then either through electrode 22, liquid in tank 4, electrode 18 and lead 68 to ground, or through bi-metallic strip 112, contact 110, electrode 20, liquid in tank 4, electrode 18 and lead 68 to ground.

The continuous current responsive devices 100 and 102 comprises bi-metallic strips 104 and 112 respectively, contacts 108 and 110 respectively, and heating resistances 106 and 114 respectively. When sufficient current flows through the heating resistances 106 and 114 the strips bend from their natural position. Thus, strip 104 normally engages contact 108 and bends away from such contact when resistance 106 is sufficiently heated, and strip 112 is normally out of engagement with contact 110, but engages the same when resistance 114 sufficiently heats that strip. The continuous current responsive devices are activated, i.e. the bi-metallic strips bend into engagement with associated contacts when a predetermined current flows for a continuous interval through the associated heating resistor. Once sufficient heat has been generated to cause the strips to engage the associated contacts, a lower magnitude current will maintain the strips in engagement with the associated contacts. Thus, the continuous current responsive devices are sensitive to an activating current and a maintaining current.

*Operation of Circuit of FIGURE 3*

(a) *Condition I.*—When the level of liquid in tank 4 is below C, then no current flows in the second circuit of the system as there exists no conducting path between electrodes 20 and 22 and electrode 18. When the liquid level in tank 2 is below A, the current flowing in the first circuit is limited by level sensitive element 14 and is not sufficient to cause energization of switching means 28.

(b) *Condition II.*—When the level of liquid in tank 4 is above level C but below level D, and the level was previously below level C, then there is no complete second circuit since the liquid does not contact electrode 22, and there is no path between bi-metallic strip 112 and contact 110 to electrode 20. Thus, the current flow in the circuit is the same as with condition I.

As will be discussed under condition V, the conditions set forth in the foregoing paragraph exist when the level of liquid in tank 4 has been below C and is rising, but do not exist when the level has reached D and is declining.

(c) *Condition III.*—As is the case in the systems of FIGURES 1 and 2, the level sensitive element 14 in FIGURE 3 is short circuited when the liquid level in tank 2 is at or near B. Since under this condition the level in tank 4 is below C, no current flows in the second circuit, and the current flowing in the first circuit is of sufficient magnitude to cause energization of switching means 28 and activation of flow governing means 10. Accordingly, liquid begins to flow into tank 4.

(d) *Condition IV.*—As tank 4 begins to fill, no change is made in current flow in the circuit since bi-metallic strip 112 is not in engagement with contact 110. No current flows in the second circuit when the liquid level in tank 4 is between C and D, but the tank 4 continues to be filled since current through the first circuit maintains switching means 28 energized.

As is the case with the systems of FIGURES 1 and 2, the water level in tank 2 can decline below B while tank 4 is being filled without deenergization of switching means 28. Although more resistance appears in the first circuit as the level of liquid in tank 2 decreases, and although the current in the first circuit decreases as a result, the current is still of sufficient magnitude to maintain switching means 28 energized. The switching means, like the continuous current responsive devices, requires a certain magnitude current for initial energization, i.e., to pull blade 32 into engagement with contact 34, and a lower magnitude current to maintain the switching means energized. Thus, the switching means 28 in the systems of this invention is sensitive to an energizing current as well as to a maintaining current.

(e) *Condition V.*—As tank 4 fills, the level reaches D whereupon a current path is established between electrode 22 and electrode 18. Accordingly, current flows from point 60 through resistances 106 and 114, electrode 22, electrode 18 and lead 68 to ground. This current causes resistances 106 and 114 to heat, and as a result of bi-metallic strip 104 bends away from contact 108 and bi-metallic strip 112 bends toward and into engagement with contact 110. As soon as strip 104 breaks engagement with contact 108, current ceases to flow through the coil 30' and the first circuit and, as a result, switching means 28 is deenergized. Meanwhile, strip 112 has bent into engagement with contact 110 and a current path is established from strip 112, through lead 111, electrode 20, the liquid in tank 4, electrode 18 and lead 68 to ground. The current flowing through this path maintains resistances 106 and 114 heated and strips 104 and 112 bent. Accordingly, as the liquid level in tank 4 drops while water is drained therefrom through pipe 12, the switching means 28 remains deenergized until the liquid level drops below C, at which time condition I or condition III exists.

Figure 4:
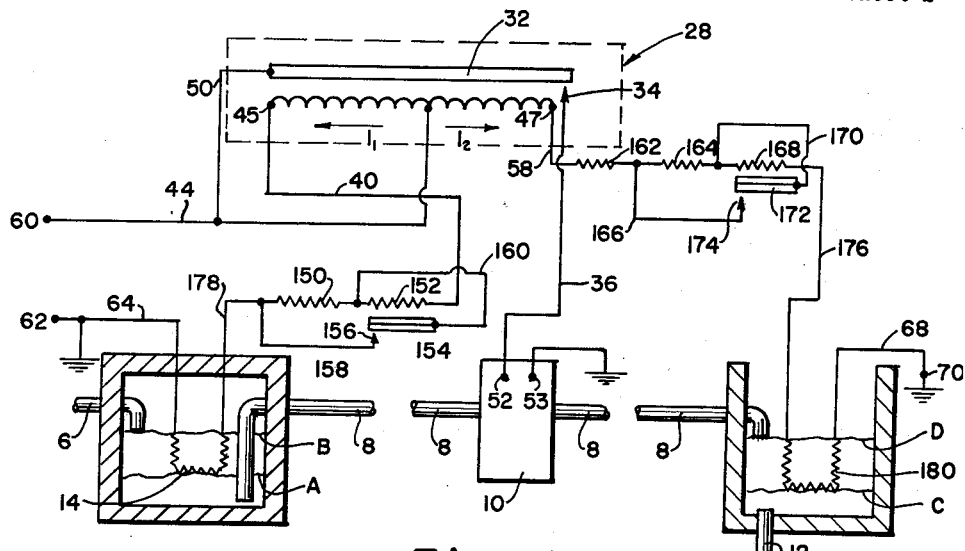
FIGURE 4 is a schematic view of a modified form of the invention which utilizes continuous current responsive devices for control of the switching means.

*Circuit of FIGURE 4.*—The circuit of FIGURE 4, like the circuits of FIGURES 1–3, includes switching means 28 operably coupled to flow governing means 10 to activate and deactivate the flow governing means 10. As in the other circuits, blade 32 engages contact 34 to complete the circuit from point 60, through lead 44, lead 50, blade 32, contact 34, lead 36 and the flow governing means.

Also, like the systems of FIGURES 1–3, the system of FIGURE 4 includes two circuits or current paths. The first current path runs from point 60, through lead 44, the left portion of coil 30, lead 40, heating resistance 152, resistance 150, lead 178, level sensitive element 14, and lead 64 to ground. The second current path runs from point 60, through lead 44, the right portion of coil 30, lead 58, resistance 162, resistance 164, heating resistance 168, lead 176, level sensitive element 180 and lead 68 to ground.

Level sensitive element 180 is the equivalent of level sensitive element 14, i.e., as shown it comprises a resistance, preferably carbon, but it may be any element whose electrical conductance varies with the level of liquid in contact therewith.

As should be apparent from an examination of FIGURE 4, heating resistances 152 and 168 serve to heat bi-metallic strips 154 and 172, which upon heating bend into engagement with contacts 156 and 174 respectively. Each set of heating resistance, bi-metallic strip and contact forms a continuous current responsive device which acts as a continuous current responsive switch just as the equivalent devices 100 and 102 act in FIGURE 3. However, in the FIGURE 4 system, the continuous current responsive devices are coupled in the circuit so as to short circuit associated resistances. In the first circuit of FIGURE 4, lead 160 connects the bi-metallic strip to one side of resistance 150, and lead 158 connects contact 156 to the other side of resistance 150. Because of this, when sufficient current flows in the first circuit, resistance 152 heats strip 154 and that strip bends into engagement with contact 156. Resistance 150 is thus short-circuited.

Similarly, in the second circuit of FIGURE 4, lead 166 connects contact 174 with one side of resistance 164, and lead 170 connects the bi-metallic strip 170 with the other side of resistance 164. Thus, when sufficient current flows in the second current, resistance 168 heats strip 172 whereupon that strip bends into engagement with contact 174 and resistance 164 is short-circuited. The continuous current responsive devices of FIGURE 4 are sensitive to an energizing current and a maintaining current just as those devices are sensitive to such current in the systems of FIGURE 3.

*Operation of Circuit of FIGURE 4*

(a) *Condition I.*—When the liquid level in tank 2 is below A, all resistances in the first circuit oppose the current flow therethroutgh. Similarly, under this condition where the water level in tank 4 is below C, all the resistances in the second circuit oppose current flow therethrough. The current components $I_1$ and $I_2$ flowing in the first and second circuits respectively are thus limited. Moreover, they flow in opposite directions in coil 30 and any magnetic fields set up as a result of the flow oppose one another. Therefore, under this condition, switching means 28 will not be energized and flow governing means 10 will not be activated.

(b) *Condition II.*—When the level of liquid in tank 4 rises above level C but is below level D, the current flow in the circuit of FIGURE 4 is the same as under condition I. Although a portion of level sensitive element 180 may be short circuited, the decrease in resistance is not sufficient to result in a sufficient change in the magnitude of the current components to cause energization of switching means 28 or sufficient heating of bi-metallic strip 172 to bend the same into engagement with contact 174. That is to say, the current is not of sufficient magnitude to energize either the switching means or continuous current responsive devices.

If the level of liquid in tank 4 reaches D, the current $I_2$ flowing in the second circuit is sufficient to heat bi-metallic strip 172 via heating resistance 168. The increase in $I_2$ results from the short circuiting of level sensitive element 180 by the liquid in tank 4. However, even when resistance 164 is short circuited, current component $I_2$ is not sufficient to cause energization of switching means 28 because resistance 162 limits the current component $I_2$ in such case.

Of course, under this condition where the liquid level in tank 2 is below A, the current flowing in the first circuit is limited by all resistances in that circuit.

(c) *Condition III.*—When the liquid level in tank 2 is at or near B, level sensitive element 14 is short circuited and the current flowing through the first circuit is sufficient to cause heating resistance 152 to heat strip 152 to a temperature at which that strip bends into engagement with contact 156. This results in short circuiting of resistance 150, and a further increase in current flowing in the first circuit. This increased current is sufficient to energize switching means 28.

The current flowing through the second circuit under this condition is limited by all resistances therein, and although it opposes the current component $I_1$ of the first circuit in coil 30, it is not of sufficient magnitude to prevent such increased component $I_1$ from causing energization of switching means 28. Thus, under condition III, blade 32 is pulled into engagement with contact 34 under the action of the magnetic field set up in coil 30, and the flow governing means 10 is activated.

(d) *Condition IV.*—When flow governing means 10 is activated under condition III, tank 4 begins to fill and the level of liquid therein rises above C and approaches D. The level sensitive element 180 is thus partially shorted and the current $I_2$ flowing in the second circuit increases. However, this increased current $I_2$ is not sufficient to cause heating resistance 168 to heat strip 172, whereby that strip bends into engagement with contact 174. Thus, flow governing means 10 remains activated and tank 4 continues to fill.

It should be understood at this time that operation under condition IV as described in this section concerns the situation where tank 4 is being filled. After the tank has been filled, and the level in the tank is decreasing, the system functions differently as explained with respect to condition V.

It should also be understood that as tank 4 fills under condition IV, the level of liquid in tank 2 can decline below C. However, even in such case, the current in the first circuit remains of sufficient magnitude to maintain switching means 28 energized even if that current is not sufficient for initial energization. As explained hereinabove, the switching means 28 is sensitive to an energizing current and to maintaining current.

(e) *Condition V.*—When the water level in tank 4 reaches D, level sensitive element 180 is short circuited, and the magnitude of current component $I_2$ has increased so that heating resistance 168 heats bi-metallic strip 168 to a temperature at which the strip bends into engagement with contact 174. The resistance of the second circuit substantially decreases because resistance 164 is short circuited. Current component $I_2$ thus increases and the field set up in coil 30 by $I_2$ opposes the field set up in that coil by $I_1$ sufficiently to result in deenergization of switching means 28. Of course, the second circuit of the system presented in FIGURE 4 is coupled in parallel relation to the first circuit of that system, and thus under condition V component $I_1$ decreases as component $I_2$ increases.

Once tank 4 has been filled, and as liquid is drained therefrom through pipe 12, the resistance of level sensitive element 180 again appears in the second circuit. But, even though the resistance of the second circuit is increased, the current component $I_2$ flowing therethrough remains of sufficient magnitude to keep strip 172 bent into engagement with contact 174. The current $I_2$ flowing in the second circuit under condition IV was essentially of the same magnitude and it will be remembered that such current was not sufficient to bend strip 172 into engagement with contact 174. However, as explained above, more current is required to cause the bimetallic strips to bend into engagement with the contacts than is required to maintain the strips in bent condition. Thus, although the current is the same under two conditions, the operation differs because of previous circuit circumstances.

Figure 5:
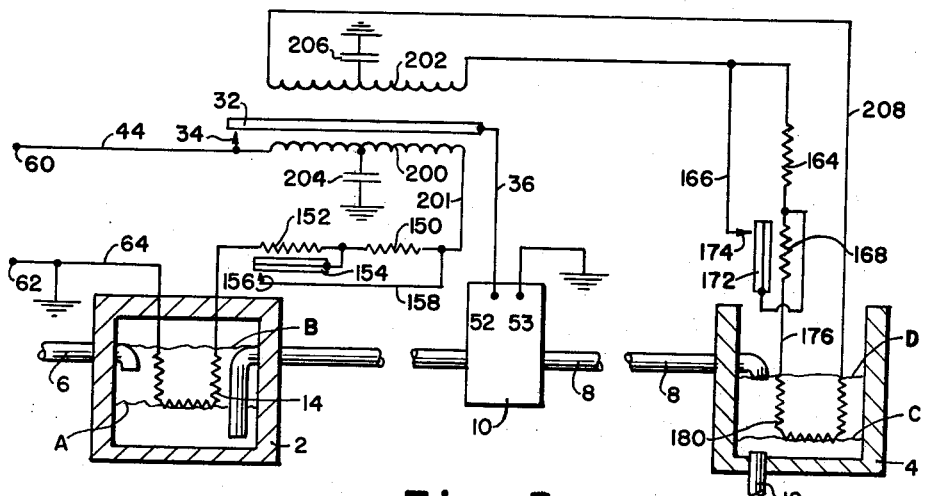
FIGURE 5 is a schematic view of a system provided by this invention which allows for isolating the circuit associated with the supply tank from the circuit associated with storage tank.

*Circuit of FIGURE 5.*—The system of FIGURE 5 incorporates two current paths as do the systems presented in other figures of the drawings. However, the system of FIGURE 5 provides a primary circuit and a secondary circuit. The primary circuit or current path extends from point 60, through lead 44, coil 200, lead 201, resistance 150, heating resistance 152, level sensitive element 14 and lead 64 to ground. Bi-metallic element 154 and contact 156, are coupled to the circuit so as to short circuit resistance 150 when sufficient current flows through heating resistance to cause that resistance to raise strip 154 to a temperature at which it bends into engagement with contact 156. Components 150, 152, 154 and 156 function in the same manner as they function in the system of FIGURE 4.

The secondary circuit of FIGURE 5 comprises coil 202, level sensitive element 180, heating resistance 168, and resistance 164. Bi-metallic strip 172, when heated under the action of resistance 168 bends into engagement with contact 174 so that under such circumstances resistance 164 is short circuited. The same functions are performed by elements 164, 168, 172, and 174 in the FIGURE 5 system as are performed by the same elements in the system of FIGURE 4.

In each of the circuits of the FIGURE 5 system, the coils are tapped between their ends, and a capacitor is coupled between these taps and ground. The capacitors designated by numerals 204 and 206 serve as filtering means to prevent any interference in the operation which may result from instantaneous static fields and/or currents set up between engaging components in the circuit such as the bi-metallic strips and associated contacts.

Operation of Circuit of FIGURE 5

(a) *Condition I.*—When the water level in tank 2 is below A, all the resistances in the primary circuit oppose the flow of current therethrough, and all the resistances in the secondary circuit oppose the flow of current therethrough. Thus, there is no flow of current in the system sufficient to energize the switching means 28.

(b) *Condition II.*—The current flow in the system of FIGURE 5 under condition II is essentially the same as under condition I, however, since part or all of level sensitive element 180 is short circuited by liquid in tank 4, the resistance in the secondary circuit is lower than when the system operates under condition I. Thus, more current flows in the secondary circuit. However, the field set up by such current opposes the field set up by current in the primary circuit, and thus switching means 28 is not energized.

(c) *Condition III.*—When the level of liquid in tank 2 is at or near B, level sensitive element 14 is short circuited, and the current in the primary circuit increases to a magnitude at which heating resistance 152 heats strip 154 and causes the same to bend into engagement with contact 156. This results in short circuiting of resistance 150, and a further increase in the current flowing in the primary circuit. Under such conditions, the current flowing in the primary circuit is sufficient to energize switching means 28, i.e. blade 32 is pulled into engagement with contact 34 and flow governing means 10 is activated.

The resistance of the secondary circuit is a maximum under condition III, as well as condition I, and the current flowing in the secondary circuit does not set up a sufficient field opposing the field set up by current in the primary circuit to present energization of switching means 28. Accordingly, under condition III liquid begins to flow from tank 2 to tank 4.

(d) *Condition IV.*—As the level of liquid in tank 4 begins to rise part of level sensitive element 180 becomes short circuited, and the magnitude of the current flowing in the secondary circuit increases. However, the increase is not sufficient when the system operates in this condition to (a) cause heating resistor 168 to heat strip 172 whereby that strip bends into engagement with contact 174, or (b) set up a field which opposes the field set up in the primary circuit so as to result in deenergization of switching means 28.

As tank 4 is filled, the level of liquid in tank 2 may decline below B resulting in an increased resistance in the first circuit, and a decreased current in that circuit. The decreased current, however, is of sufficient magnitude to maintain switching means 28 energized, because double coil switching means of the FIGURE 5 system, like the single coil switching means, is sensitive to an energizing current as well as a maintaining current.

(e) *Condition V.*—When the liquid level in tank 4 rises to D, level sensitive element 180 is short circuited, and the current flowing in the secondary circuit increases to a magnitude where heating resistance 168 causes bi-metallic strip 172 to bend into engagement with contact 174. At such time resistance 164 is short circuited. The resistance in the secondary circuit has, as a result, decreased to a point where the current flowing in the secondary circuit sets up a field in coil 202 sufficiently powerful to cause switching means 28 to be deenergized, i.e., the field set up in coil 200 is no longer able to pull blade 34 into engagement with contact 34 because of the opposing field set up in coil 202. Thus, there is no longer a complete circuit from point 60, through the contact 34, blade 32, lead 36 and the flow governing means 10, and tank 4 ceases to receive liquid through tank 8.

After tank 4 has been filled, the level of liquid therein decreases below D and approaches C, and part of the resistance of level sensitive element 180 appears in the secondary circuit. Although this decreases the current flowing in the secondary circuit, (1) there is still a current of sufficient magnitude to maintain resistance 168 heated to a temperature at which strip 172 is held bent into engagement with contact 174, and (2) the current flowing in the secondary circuit remains of sufficient magnitude to set up a field in coil 202 opposing energization of switching means 28.

It should be apparent from the drawing that FIGURE 5 is particularly useful in situations where it becomes necessary to isolate the circuit associated with tank 4 from the circuit associated with tank 2. Although there is an inductive link between the primary and secondary circuits of FIGURE 5 via coils 200 and 202, there is no direct current path between those circuits.

GENERAL CONSIDERATIONS

In the foregoing paragraphs, the particular circuits and conditions of operation have been discussed and the manner in which switching means 28 is energized and deenergized has been considered. In each case, switching means 28 comprises at least one coil which serves to push or pull a blade 32 into engagement with a contact 34. Solenoids comprising such components are commercially available in many forms today.

However, according to this invention, a solenoid having a center tap is employed in the systems of FIGURES 1, 4 and 5. Such solenoid may have the tap located at various positions between the ends of the coil, and the values of resistances in the circuit can be adjusted accordingly to provide for operation as explained hereinabove. Moreover, in the systems of FIGURES 1 and 4, two coils wound over a common core may be used in place of the center-tapped coil. In such cases, the finish or terminal end of the first coil would be connected to the start or initial end of the second coil and a lead to that connection would serve as a "center-tap" connector.

Throughout the description of operation of the various systems, reference has been made to the fact that a current of a given magnitude, or a magnetic field resulting from a current or currents, is sufficient to maintain switching means 28 energized, but is not sufficient to cause energization of the switching means. Solenoids or switching means used according to the preferred embodiments of this invention require a larger magnitude of current for energization than is required to maintain the same energized. Such solenoids or switching means are sensitive to an energizing current and a maintaining current. The energizing current is the current required to cause the blade to engage the associated contact when the two components are not already in engagement.

The maintaining current is the current required to keep the blade in engagement with an associated contact once the initial engagement of components has taken place.

Similarly, the current required to activate one of the continuous current responsive devices is greater than the current required to maintain the device activated. The heating resistances used with the bi-metallic strips may have to be heated to a temperature of, for example, 170° C. before the strip bends into engagement with an associated contact, and yet need only be heated to a temperature of, for example, 80° C. in order to maintain the bi-metallic strip in engagement with an associated contact.

The set of components consisting of a bi-metallic strip, an associated contact, and a heating resistance has been referred to as a continuous current responsive device because instantaneous currents do not affect such set of components. A continuous current is required for heating, and any current flowing as a result of a splash or ripple in one of the tanks has no effect on such devices.

As pointed out hereinabove, the level sensitive elements are resistances which have a square U-shape. The squareness of such devices is preferred because it gives a substantial change in circuit resistance upon short circuiting at the level of the base of the U. Thus, while the level in tank 2 is declining and approaches A there is a relatively gradual change in circuit resistance, but when it passes C, there is an abrupt change.

The values of resistances used in the systems presented in the drawings can be chosen by one of ordinary skill in the art to serve their given function. The particular values are thus not the subject matter of the instant invention.

It should be understood that although only resistances have been shown for current limiting purposes, and for heating purposes, any impedance may be used which performs the required function. It should also be understood that blades 32 of the switching means are normally urged away from contacts 34 by a spring or the like, so that a magnetic attraction is required to bring such blades into engagement with contacts 34.

From the foregoing detailed description of the exemplary embodiments of the invention, it should be apparent that the objects set forth initially have been fully achieved. Accordingly, I claim:

1. In a liquid storage system including electrically responsive means governing the flow of liquid at any temperature through conduit means connecting a supply reservoir with a storage tank, the combination therewith of an electrical control system comprising a single electrical switching means separate from said flow governing means and operably connected to said flow governing means, a first circuit coupled to said switching means and including means for preventing energization of said switching means when the liquid in said supply reservoir is below a given level, and also coupled to said switching means, a second and separate circuit including at least two electrodes disposed in said storage tank and terminating at a first level in said storage tank and operably coupled to said switching means for causing energization of said switching means when the liquid in said storage tank is below said first level, and at least one additional electrode disposed in said storage tank and terminating at a second level above said first level, said one additional electrode cooperating with one of said two electrodes and being coupled to said switching means for causing energization of said switching means when the liquid in said storage tank is at, or above, said second level, said switching means including a coil being tapped between its ends, said first circuit being coupled to said coil between said tap and one end thereof, said second circuit being coupled between the other end of said coil and electrical ground.

2. In a liquid storage system including electrically responsive means governing the flow of liquid at any temperature through conduit means connecting a supply reservoir with a storage tank, the combination therewith of an electrical control system as defined in claim 1, wherein at least one of said two electrodes is coupled via a first resistor to said other end of said coil, wherein said additional electrode is coupled via a second resistor to said other end of said coil, and wherein said second resistor offers less opposition to current flow than the first resistor.

3. In a liquid storage system including electrically responsive means governing the flow of liquid at any temperature through conduit means connecting a supply reservoir with a storage tank, the combination therewith of an electrical control system comprising a single electrical switching means separate from said flow governing means and operably connected to said flow governing means, a first circuit coupled to said switching means and including means for preventing energization of said switching means when the liquid in said supply reservoir is below a given level, and also coupled to said switching means, a second and separate circuit including at least two electrodes disposed in said storage tank and terminating at a first level in said storage tank and operably coupled to said switching means for causing energization of said switching means when the liquid in said storage tank is below said first level, and at least one additional electrode disposed in said storage tank and terminating at a second level above said first level, said one additional electrode cooperating with one of said two electrodes and being coupled to said switching means for causing energization of said switching means when the liquid in said storage tank is at, or above, said second level, said switching means including a coil, said first circuit having said coil serially coupled therein with one end of said coil coupled to said means for preventing energization of said switching means, said second circuit being coupled between the other end of said coil and electrical ground.

4. In a liquid storage system including electrically responsive means governing the flow of liquid at any temperature through conduit means connecting a supply reservoir with a storage tank, the combination therewith of an electrical control system as defined in claim 3, wherein at least one of said two electrodes is coupled via a first resistor to said other end of said coil, wherein said additional electrode is coupled via a second resistor to said other end of said coil, and wherein said second resistor offers less opposition to current flow than the first resistor.

5. In a liquid storage system including electrically responsive means governing the flow of liquid at any temperature through conduit means connecting a supply reservoir with a storage tank, the combination therewith of an electrical control system comprising a single electrical switching means separate from said flow governing means and operably connected to said flow governing means, a first circuit coupled to said switching means and including means for preventing energization of said switching means when the liquid in said supply reservoir is below a given level, and also coupled to said switching means, a second and separate circuit including at least two electrodes disposed in said storage tank and terminating at a first level in said storage tank and operably coupled to said switching means for causing energization of said switching means when the liquid in said storage tank is below said first level, and at least one additional electrode disposed in said storage tank and terminating at a second level above said first level, said one additional electrode cooperating with one of said two electrodes and being coupled to said switching means for causing energization of said switching means when the liquid in said storage tank is at, or above, said second level, said first and second circuits being coupled together via a first continuous current responsive device including means in said first circuit for opening said first circuit and operating means in said second circuit for causing said means in said first circuit to open said first circuit.

6. In a liquid storage system including electrically responsive means governing the flow of liquid at any temperature through conduit means connecting a supply reservoir with a storage tank, the combination therewith of an electrical control system as defined in claim 5 wherein said second circuit includes a second continuous current responsive device having contact means and means to close said contact means and being coupled to said first continuous current responsive device, wherein one of said two electrodes is coupled to electrical ground, wherein the other one of said two electrodes is coupled via said contact means to said first continuous current responsive device, and wherein said additional electrode is coupled via said operating means to said first continuous current responsive device.

7. In a liquid storage system including electrically responsive means governing the flow of liquid at any temperature through conduit means connecting a supply reservoir with a storage tank, the combination therewith of an electrical control system comprising switching means operably coupled to said flow governing means for activating and deactivating said flow governing means, said switching means having a coil; a first circuit having serially connected therein said coil, a level sensitive element disposed in said supply reservoir, and a first and normally closed circuit breaking means; and a second circuit including means to open said first circuit breaking means, at least two electrodes disposed in said storage tank and terminating at a first level, one of said two electrodes being coupled to electrical ground, the other of said electrodes being coupled via a second and normally open circuit breaking means to said means to open said first circuit breaking means, and an additional electrode terminating at a second level above said first level, said additional electrode terminating at a second level above said first level, said additional electrode being coupled via means to close said second circuit breaking means to said means to open said first circuit breaking means.

8. In a liquid storage system including an electrical pump means adapted to deliver liquid through conduit means connecting a supply tank on one level to a storage tank on a higher level, a water level control system for connection with an electrical power supply comprising an electromagnetic switching means operatively connected to said pump means and having a coil means tapped between its ends, a first series circuit coupled between one of said coil and said tap and including a supply tank liquid level sensitive element having a resistance characteristic which varies with liquid level, a first resistance and a first continuous current responsive device having a temperature sensitive element for rendering said first resistance ineffective under a given condition, said first series circuit serving to prevent energization of said switching means and thereby said pump means when the level of liquid in said supply tank is below a predetermined level, and a second series circuit coupled between the other end of said coil means and an electrical ground and including a storage tank liquid level sensitive element having a resistance characteristic which varies with liquid level, a second resistance, and a second continuous current responsive device having a temperature sensitive element for rendering said second resistance ineffective under a predetermined condition said second series circuit serving to cause energization and deenergization of said switching means and thereby said pump means in accordance with the level of liquid in said storage tank.

9. In a liquid storage system including electrically responsive means governing the flow of liquid at any temperature through conduit means connecting a supply reservoir with a storage tank, the combination therewith of an electrical control system comprising a single electrical switching means separate from said flow governing means and operably connected with said flow governing means, said switching having two conductively isolated coils magnetically coupled to one another, a first series circuit coupled to one coil of said switching means and including means for preventing energization of said switching means when the liquid in said supply reservoir is below a given level, and a second and separate series circuit coupled to the other coil of said switching means and including means for causing energization of said switching means when the liquid in said storage tank is below a predetermined level and for causing deenergization of said switching means when the liquid in said storage tank is above another predetermined level.

10. The combination defined in claim 9 wherein said switching means is electromagnetic, and wherein said means for preventing energization of the switching means and said means for causing energization and deenergization of said switching means include continuous current responsive devices.

References Cited in the file of this patent

UNITED STATES PATENTS

| | | |
|---|---|---|
| 2,454,161 | Hall | Nov. 16, 1948 |
| 2,759,130 | Brewer | Aug. 14, 1956 |
| 2,884,001 | Herrero | Apr. 28, 1959 |